(12) United States Patent
Power et al.

(10) Patent No.: US 9,869,087 B2
(45) Date of Patent: Jan. 16, 2018

(54) INSULATION AND VENTILATION SYSTEMS FOR BUILDING STRUCTURES

(71) Applicant: Powerhouse Building Solutions (2009) Inc., Port Coquitlam (CA)

(72) Inventors: Ross Patrick Power, Port Moody (CA); Scott Emo, Maple Ridge (CA)

(73) Assignee: Ross Power Investments Inc., Surrey, British Columbia (CA)

( * ) Notice: Subject to any disclaimer, the term of this patent is extended or adjusted under 35 U.S.C. 154(b) by 0 days.

(21) Appl. No.: 14/293,989

(22) Filed: Jun. 2, 2014

(65) Prior Publication Data

US 2015/0013257 A1 Jan. 15, 2015

Related U.S. Application Data

(63) Continuation of application No. 13/471,106, filed on May 14, 2012, now Pat. No. 8,769,894.

(Continued)

(51) Int. Cl.
*E04B 1/70* (2006.01)
*E04F 13/08* (2006.01)
(Continued)

(52) U.S. Cl.
CPC .............. *E04B 1/7076* (2013.01); *E04B 1/70* (2013.01); *E04B 2/707* (2013.01); *E04F 13/0869* (2013.01); *E04B 2001/386* (2013.01)

(58) Field of Classification Search
CPC .... E04B 1/7076; E04B 1/70; E04B 2001/386; E04F 13/0869
See application file for complete search history.

(56) References Cited

U.S. PATENT DOCUMENTS 2,264,961 A * 12/1941 Ward ...................... E04B 1/767
52/302.3
3,280,528 A 10/1966 Dunlap
(Continued)

FOREIGN PATENT DOCUMENTS

CA 103708 6/2004
CA 2566552 4/2008
(Continued)

OTHER PUBLICATIONS

Insul-Vent™ data sheet (Jul. 24, 2007).
(Continued)

*Primary Examiner* — Brian Glessner
*Assistant Examiner* — Adam Barlow
(74) *Attorney, Agent, or Firm* — Todd A. Rattray; Oyen Wiggs Green & Mutala LLP

(57) ABSTRACT

One aspect of the invention relates to an insulation and ventilation system for a building envelope (e.g. a building wall and/or a building roof).
The system includes: one or more interior building envelope layers; an insulation panel having an interior side abutting against at least one of the one or more interior building envelope layers and an exterior side having a plurality of transversely spaced and continuously longitudinally extending grooves interspaced between a plurality of transversely spaced and continuously longitudinally extending protrusions; and one or more exterior building envelope layers located exterior to the insulation panel to provide a plurality of transversely localized venting channels defined at least in part by an interior surface of the one or more exterior building envelope layers and the grooves of the exterior side of the insulation panel.

22 Claims, 13 Drawing Sheets

Related U.S. Application Data

(60) Provisional application No. 61/485,476, filed on May 12, 2011.

(51) Int. Cl.
*E04B 2/70* (2006.01)
*E04B 1/38* (2006.01)

(56) References Cited

U.S. PATENT DOCUMENTS

| | | | | |
|---|---|---|---|---|
| 3,318,056 | A | * | 5/1967 | Thompson ............... E04B 2/709 52/105 |
| 3,881,292 | A | | 5/1975 | Porter |
| 3,949,529 | A | | 4/1976 | Porter |
| 4,000,595 | A | * | 1/1977 | Fortescue ............ G21C 11/086 220/62.19 |
| 4,320,613 | A | * | 3/1982 | Kaufman ............ E04F 13/0864 52/302.1 |
| 4,791,768 | A | * | 12/1988 | Crean ................. E04B 1/34336 52/309.11 |
| D321,103 | S | | 10/1991 | Duffey |
| 5,271,198 | A | | 12/1993 | Freeman |
| 5,280,689 | A | * | 1/1994 | Mill ........................ E04B 2/92 52/169.14 |
| 5,285,607 | A | | 2/1994 | Somerville |
| 5,333,429 | A | | 8/1994 | Cretti |
| 5,473,847 | A | * | 12/1995 | Crookston .............. E04C 2/205 454/260 |
| 5,615,525 | A | * | 4/1997 | Kenworthy ............. E02D 31/02 405/45 |
| 5,758,464 | A | | 6/1998 | Hatton |
| 5,765,333 | A | | 6/1998 | Cunningham |
| 6,298,620 | B1 | | 10/2001 | Hatzinikolas |
| 6,355,333 | B1 | * | 3/2002 | Waggoner ................ E04B 1/62 428/174 |
| D462,458 | S | | 9/2002 | Hughes et al. |
| 6,571,523 | B2 | | 6/2003 | Chambers |
| 6,594,965 | B2 | * | 7/2003 | Coulton ................ E04B 1/7046 52/302.1 |
| D482,140 | S | | 11/2003 | Hughes et al. |
| 6,886,301 | B2 | | 5/2005 | Schilger |
| 6,990,775 | B2 | * | 1/2006 | Koester .................... E04B 1/70 428/121 |
| 7,367,165 | B2 | * | 5/2008 | Hatzinikolas ......... E04B 1/7046 52/302.1 |
| 7,421,826 | B2 | * | 9/2008 | Collins ................. E04B 1/4178 52/169.5 |
| 7,972,688 | B2 | | 7/2011 | Letts et al. |
| D671,660 | S | | 11/2012 | Conterno |
| D688,438 | S | | 8/2013 | Jani et al. |
| 8,707,647 | B2 | | 4/2014 | Crego |
| 8,826,617 | B2 | | 9/2014 | Endo |
| 8,966,843 | B2 | | 3/2015 | Paul et al. |
| 8,986,805 | B2 | | 3/2015 | Yoon et al. |
| 2002/0108333 | A1 | * | 8/2002 | Clayton ................... E04B 1/70 52/302.1 |
| 2004/0148889 | A1 | * | 8/2004 | Bibee ....................... E04B 1/78 52/481.1 |
| 2007/0220821 | A1 | | 9/2007 | Omiya |
| 2010/0101159 | A1 | * | 4/2010 | Gleeson ................. E04B 2/707 52/105 |
| 2010/0199586 | A1 | | 8/2010 | Martineau |
| 2012/0297711 | A1 | * | 11/2012 | Ehrman ................. B32B 3/085 52/302.1 |

FOREIGN PATENT DOCUMENTS

| | | |
|---|---|---|
| CA | 131494 | 2/2010 |
| CA | 2665986 | 11/2010 |
| CA | 2674833 | 11/2010 |
| CA | 153725 | 8/2014 |
| JP | 10152907 | 6/1998 |
| JP | 3039924 | 5/2000 |
| JP | 2002121839 | 4/2002 |
| JP | 2003321892 | 11/2003 |
| SE | 531446 | 4/2009 |
| WO | 2009021264 | 2/2009 |

OTHER PUBLICATIONS

Sure-Vent™ data sheet (Jul. 24, 2007).
Durex™ data sheet (available prior to Feb. 7, 2011).
Korax™ rainscreen wall system data sheet (available prior to Jan. 17, 2011).
Quik-Therm T&G Connect, www.quiktherm.com (available prior to May 14, 2012).

* cited by examiner

INSULATION AND VENTILATION SYSTEMS FOR BUILDING STRUCTURES

RELATED APPLICATIONS

This application is a continuation of U.S. application Ser. No. 13/471,106 filed 14 May 2012 which in turn claims priority from, U.S. application No. 61/485,476 filed 12 May 2011 both of which are hereby incorporated herein by reference.

TECHNICAL FIELD

This invention relates to insulation and ventilation systems for building walls and other structures.

BACKGROUND

Exterior building wall layers (e.g. siding, stucco and/or the like) may be installed to provide an aesthetic cover for an exterior of a building wall and to protect the building structure from precipitation, wind and other environmental effects. Some types of exterior building wall layers are typically applied in the form of panels, shingles or sheets of wood, vinyl, fibre cement, aluminum or other suitable materials, which may be arranged in horizontal rows that may overlap with one another. Other types of exterior building wall layers (e.g. stucco and/or the like) are typically applied by mounting a lath to the internal building wall layers and then troweling or otherwise applying the siding layer to the lath and the internal wall layers.

Moisture which may occasionally penetrate the exterior layer(s) of a building wall and become trapped within the building wall. This problem is particularly common for buildings in wet climates. Moisture which remains in a building wall for extended periods may have deleterious effects for the building structure and its inhabitants. If moisture within a building wall does not evaporate or drain away, such moisture can result in mold growth which may negatively impact the health of people who use the building and/or rot and cause other forms of structural damage to the building structure. There is a general need for systems for building walls which can provide ventilation or which can otherwise permit moisture to escape from within a building wall.

The exterior walls of building structures (e.g. walls between the building and the outdoors) may also include insulation layer(s). Insulation reduces the rate of heat dissipation through the building wall (e.g. from an interior of the building wall to an exterior of the building wall or vice versa). Unwanted heat loss or gain through building walls can increase the energy demands of heating and cooling systems and can also create undesirable dew points in areas of the building which may in turn lead to condensation, mold and/or structural damage. There is a general need to provide insulation in exterior building walls.

BRIEF DESCRIPTION OF DRAWINGS

In drawings which show non-limiting embodiments of the invention.

DESCRIPTION

Figure 1A:
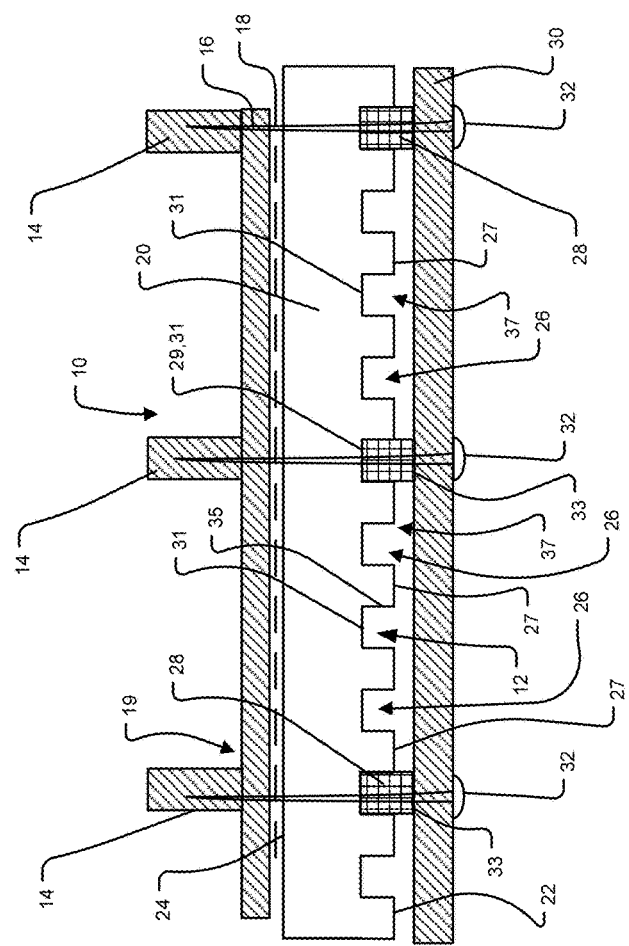
FIG. 1A is a horizontal sectional view of a portion of a building wall incorporating an insulation and ventilation system according to an embodiment of the invention.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Aspects of the invention provide insulation and ventilation systems for building walls and other building structures. Insulating panels (which may comprise rigid or semi-rigid insulation panels of foam or other insulating material(s)) are provided with a series of transversely alternating, vertically extending and outwardly opening grooves and protrusions. The grooves and protrusions may be substantially continuous in vertical directions (e.g. between a top edge and bottom edge of each insulating panel). A plurality of insulating panels are mounted to an interior wall layer. One or more exterior wall layer(s) are then mounted on an outside of the insulation panels. In some embodiments, the grooves of the insulation panels may accommodate optional furring strips which may assist with the mounting of the one or more exterior wall layer(s)—e.g. a furring strip may be secured or temporarily secured between the walls of a corresponding groove by restorative forces associated with the deformation of the insulating panels (restorative deformation forces). Exterior wall layer(s) may be mounted by fasteners which project through the exterior wall layer(s), the optional furring strips, the insulation panels and into interior wall layers (e.g. sheathing and/or studs). In some embodiments, exterior wall layer(s) may be mounted by fasteners which extend through the exterior wall layer(s), through the optional furring strips and into (but not necessarily through) the insulation panels. In some embodiments, exterior wall layer(s) may be mounted by fasteners which extend through the exterior wall layer(s) and into (but not necessarily through) the optional furring strips and/or into (but not necessarily through) the insulation panels.

In some embodiments, furring strips may additionally or alternatively be mounted by a first set of fasteners which project through the furring strips and into one or more interior wall layers (e.g. sheathing and/or studs) and/or into the insulation panels. In such embodiments, exterior wall layer(s) may be mounted by a second set of fasteners which project through the exterior wall layer(s) and into (but not necessarily through) the optional furring strips and/or into (but not necessarily through) the insulation panels.

Once exterior wall panels are mounted in this manner, localized ventilation channels are provided between an exterior of the insulation panels and an interior of the exterior wall layer(s) (and possibly between optional furring strips). These ventilation channels permit air flow therethrough for localized venting of the building wall.

In some embodiments, furring strips are not required and the one or more exterior wall layer(s) may be mounted to abut against the protrusions of the insulation panels. In some such embodiments, the exterior wall layer(s) may be mounted by fasteners which project through the exterior wall layer(s), the insulation panels and into the interior wall layers (e.g. sheathing and/or studs). In other such embodiments, exterior wall layer(s) are mounted by fasteners which project through the exterior wall layer(s) and into (but not necessarily through) the insulation panels. Once mounted in this manner, the insulation panel grooves provide localized ventilation channels between an exterior of the insulation panels and an interior of the exterior wall layer(s). These ventilation channels permit air flow therethrough for localized venting and/or drainage of the building wall.

This description employs a number of simplifying directional conventions. Directions are described in relation to a vertical building wall. Directions may be referred to as: "external", "exterior", "outward" or the like if they tend toward an exterior of the building wall; "internal", "interior", "inward" or the like if they tend toward an interior of the building wall; "upward" or the like if they tend toward the top of a building wall; "downward" or the like if they tend toward the bottom of a building wall; "vertical" or the like if they tend upwardly, or downwardly or both upwardly and downwardly; and "sideways", "transverse" or the like if they tend horizontally in the plane of the building wall. It will be appreciated by those skilled in the art that these directional conventions are used for the purpose of facilitating the description and should not be interpreted in a literal sense. In particular, the invention may be employed, for example, in walls that are not strictly vertically oriented, or in roofing structures that are inclined.

FIG. 1A is a schematic sectional view (along a horizontal plane) of a portion of a building wall structure 10 which incorporates an insulation and ventilation system 12 according to a particular embodiment of the invention. In FIG. 1A, building wall structure 10 includes a plurality of transversely spaced apart, vertically extending studs 14 and an optional sheathing panel 16 which is mounted adjacent to an exterior side of studs 14. Sheathing panel 16 might typically be made from plywood, oriented strand board (OSB), gypsum, other exterior insulation layers or the like. The exterior side of sheathing panel 16 may be covered with an optional building wrap 18, such as building paper, Tyvek® or Typar™ building wrap or the like. Where optional sheathing is not used, building wrap 18 may directly cover studs 14. Sheathing panel 16 (where present), building wrap 18 (where present) and studs 14 may be referred to herein as interior building layers 19. As will be apparent to those skilled in the art, building wall structure 10 may include other components and/or structures (e.g., plaster, dry wall, insulation or the like) interior to sheathing panel 16. Such other components and/or structures may also form part of interior building layers 19. These other components and/or structures are well understood by those skilled in the art and are omitted from FIG. 1A for clarity.

Figure 6A:
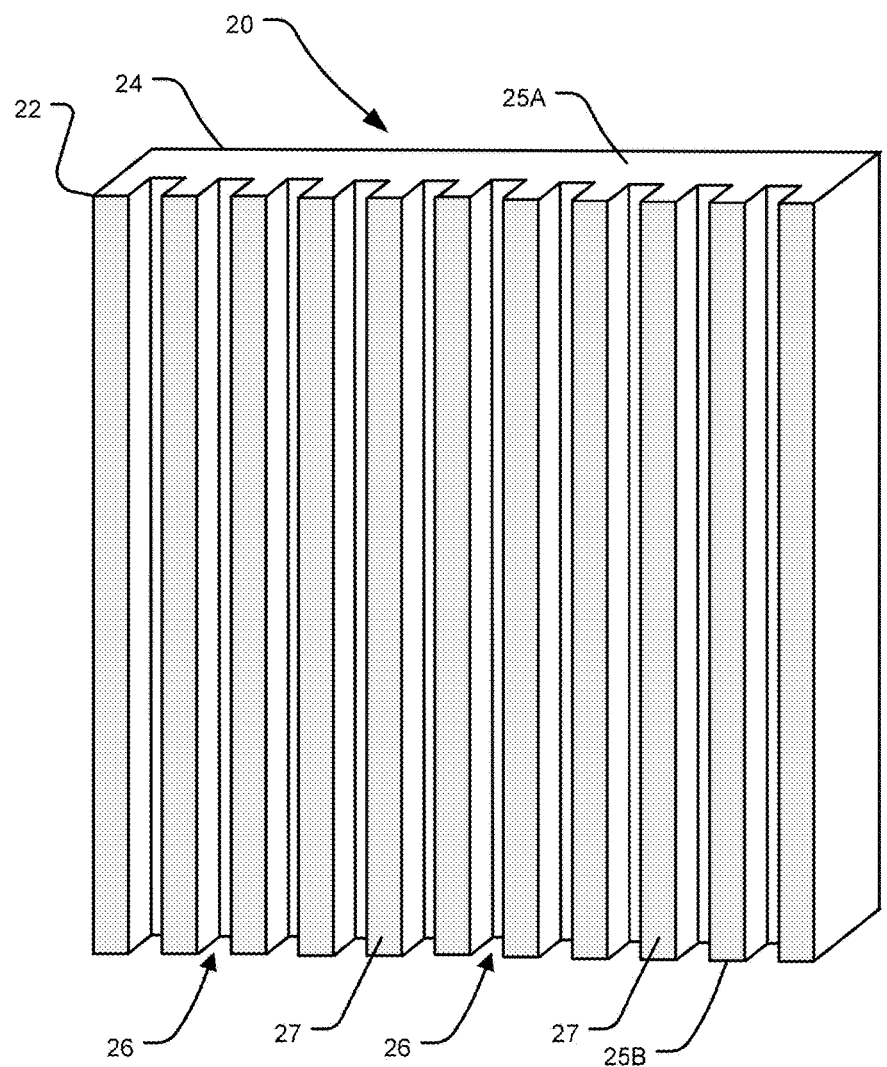
FIG. 6A is perspective view of the FIG. 1A insulation panel similar to the insulation panel in FIG. 1A.
Figure 6B:
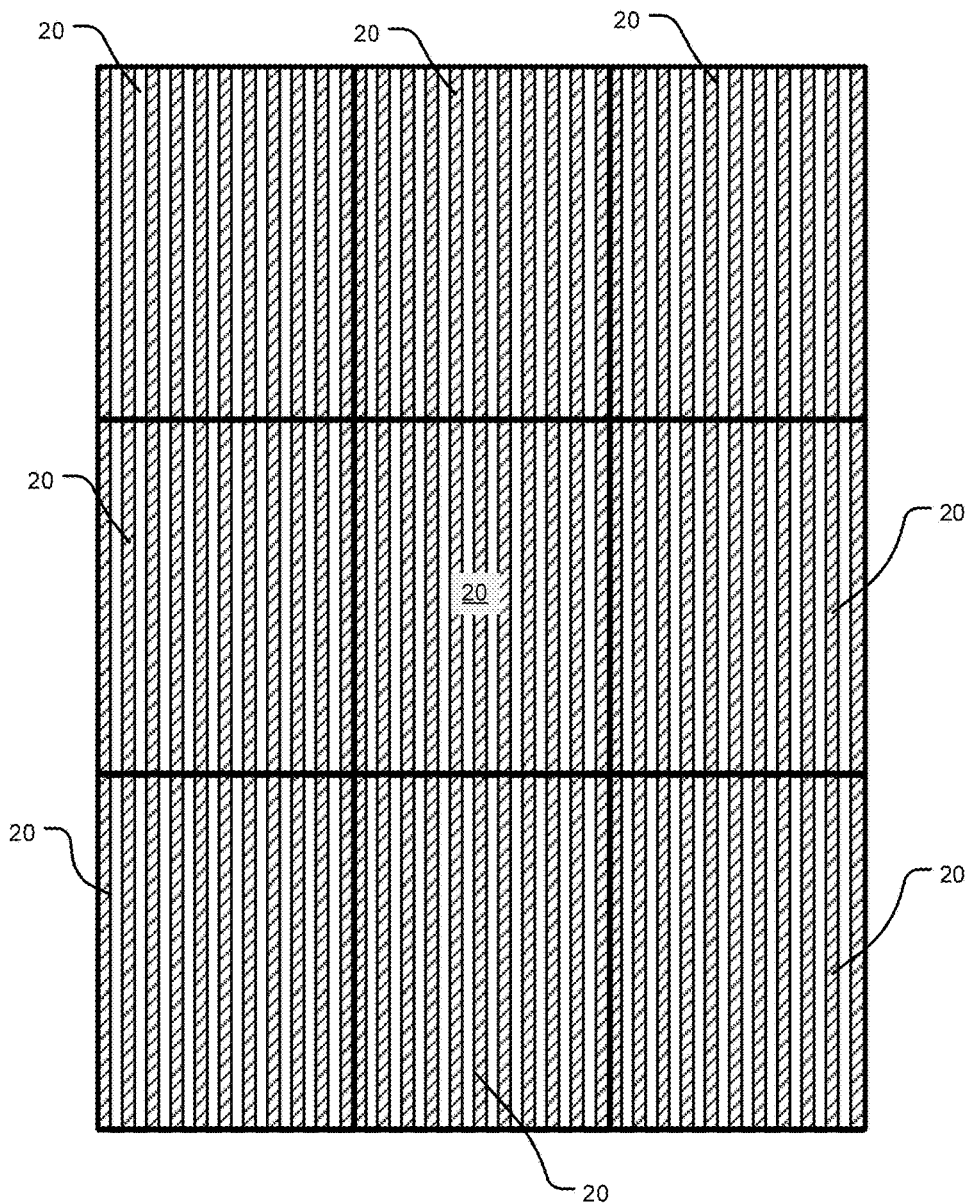
FIG. 6B is a side plan view of a portion of a building wall showing how a plurality of insulation panels may be mounted to the interior wall layers to provide insulation and ventilation systems according to particular embodiments.

Insulation and ventilation system 12 of the FIG. 1A embodiment includes insulation panels 20 mounted to the exterior side of interior building layers 19. A single insulation panel 20 is shown in the FIG. 1A portion of building wall structure 10. A schematic perspective view of an exemplary insulation panel 20 in isolation from the rest of building wall structure 10 is shown in FIG. 6A. FIG. 6B shows a plan view of a portion of a building wall structure showing how a plurality of insulation panels 20 may be mounted to interior wall layers 19 to provide insulation and ventilation systems according to particular embodiments. Insulation panel 20 is thermally non-conducting (or minimally thermally conducting) and provides thermal insulation to building wall structure 10. Insulation panel 20 may comprise foam insulation and may be made from polystyrene, polyisocyanurate or other suitable material(s). Insulation panel 20 may be rigid (e.g. rigid foam insulation) or semi-rigid (e.g. sufficiently rigid to support its own weight without substantial deformation). In other embodiments, insulation panel 20 may comprise other insulating materials, such as organic insulation material (e.g. mycelium, flax fiber, straw, cellulose) or other inorganic insulation material (e.g. mineral wool, rigid fibreglass). In other embodiments, insulation panel 20 need not be overly rigid and may have some flexibility. Insulation panel 20 has an exterior side 22 and an interior side 24. In some embodiments, insulation panel 20 has a generally rectangular shape (FIGS. 6A, 6B). Insulation panel 20 may be made of any height, width, or thickness as may be desirable. Insulation panel 20 may be made in a variety of standard heights, e.g. 2 feet, 4 feet or 8 feet, and in a variety of standard widths, e.g. 2 feet, 4 feet or 8 feet, to accommodate various wall building standards or customs (e.g. stud spacing regulations, ceiling height customs and/or the like).

Exterior side 22 of insulation panel 20 includes a plurality of transversely alternating, vertically extending and outwardly opening grooves 26 and vertically extending and outwardly extending protrusions 27 (also referred to herein as projections 27). Transversely adjacent grooves 26 are separated from each other by projections 27. Grooves 26 may be evenly transversely spaced from one another (i.e. the transverse dimensions of projections 27 may be equal to one another), although this is not necessary. Projections 27 may be evenly transversely spaced from one another (i.e. the transverse dimensions of grooves 26 may be equal to one another), although this is not necessary. In the illustrated FIG. 1A embodiment, the transverse dimensions of projections 27 are approximately the same as the transverse dimensions of grooves 26, although, again, this is not necessary. In some embodiments of building wall 10 and ventilation system 12, the ratios of the transverse widths of projections 27 and grooves 26 may be dictated by applicable building codes, industry standards, industry-accepted criteria and/or the like. For example, in some embodiments of building wall 10 and ventilation system 12, a ratio of the transverse dimension of each groove 26 to each projection 27 on a panel 20 is greater than 3:1. In some embodiments of building wall 10 and ventilation system 12, this ratio is greater than 4:1. In some embodiments of building wall 10 and ventilation system 12, a ratio of the sum of the transverse dimensions of all of the grooves 26 to a sum of the transverse dimensions of all of the projections 27 on a panel 20 is greater than 3:1. In some embodiments of building wall 10 and ventilation system 12, this ratio is greater than 4:1.

In some embodiments the depths of the grooves may additionally or alternatively be specified by applicable building codes, industry standards, industry-accepted criteria and/or the like. For example, in some embodiments of building wall 10 and ventilation system 12, the depth of grooves may be required to be over ¼" (6 mm) thick over at least a portion (e.g. 75% or 80%) of the surface area of the wall. In some embodiments of building wall 10 and ventilation system 12, the depth of grooves may be required to be over ⅜" (10 mm) thick over at least a portion (e.g. 75% or 80%) of the surface area of the wall.

In some embodiments of building wall 10 and ventilation system 12, the transverse widths of grooves 26 are selected to be sufficiently small (e.g. smaller than the narrowest transverse siding width), so that such transversely narrow siding elements of exterior wall layer(s) 30 can be mounted without the need for cross-strapping—e.g. so a siding element of exterior wall layer(s) 30 can span the transverse dimension of grooves 26. In some embodiments of building wall 10 and ventilation system 12, the transverse widths of grooves 26 are selected to be less than 8 inches. In some of building wall 10 and ventilation system 12, the transverse widths of grooves 26 are selected to be less than 4 inches. In some of building wall 10 and ventilation system 12, the transverse widths of grooves 26 are selected to be less than 2 inches. In some embodiments of building wall 10 and ventilation system 12, the transverse widths of protrusions are selected to be sufficiently large to permit mounting of exterior wall layer(s) 30 without the need for cross-strapping.

In the illustrated embodiment, panel 20 comprises projections 27 at both of its transverse edges. This is not necessary. In some embodiments, panels 20 may comprise grooves 26 at both of their transverse edges or a groove 26 at one transverse edge and a projection 27 at the opposing transverse edge.

As shown best in FIG. 6A, projections 27 and grooves 26 may be continuously vertically extending (i.e. without any gaps) over the vertical dimension of panel 20 between its upper edge 25A and a lower edge 25B. In the illustrated embodiment, the vertical extension of projections 27 and grooves 26 is generally perpendicular to upper and lower edges 25A, 25B of insulation panel 20. In some embodiments, grooves 26 are sized to be capable of receiving or otherwise accommodating furring strips 28 (shown in FIG. 1A). In particular embodiments, the transverse dimensions of grooves 26 are sized such that when a furring strip 28 is received in one of grooves 26, furring strip 28 deforms the edges of groove 26, to provide a friction fit and/or a resilient deformation fit. A resilient deformation fit occurs where the deformation of the edges of groove 26 (i.e. the deformation of projections 27) by insertion of furring strip 28 creates a corresponding restorative deformation force (i.e. a force that tends to restore groove 26 and/or projections 27 to their original undeformed state) and such restorative deformation force tends to retain furring strip 28 in groove 26. The transverse dimensions of grooves 26 may be sized to accommodate industry standard-sized furring strips 28. In some embodiments, such transverse groove dimensions may be in a range of ¾" to 6". In currently preferred embodiments, such transverse groove dimensions are in a range of 1" to 4".

In the FIG. 1A embodiment, the depth of grooves 26 is less than the thickness of furring strips 28, such that when a furring strip 28 is inserted into groove 26 such that an interior face 29 of furring strip 28 abuts against an exterior-facing base surface 31 of groove 26, an exterior face 33 of furring strip 28 extends outwardly further than the outward extension of protrusions 27. The depth of grooves 26 may be sized to accommodate industry standard-sized (or custom-sized) furring strips 28. In some embodiments, such groove depth may be in a range of ⅛" to 2". In currently preferred embodiments, such groove depth is in a range of 3/16" to 1". As discussed further below, this feature of grooves 26 and furring strips 28 (i.e. the outward extension of furring strips 28 beyond the outward extension of protrusions 27) provides additional space for ventilation channels 37. This feature of grooves 26 and furring strips 28 is not necessary, however, and in other embodiments, grooves 26 may have depths that are substantially similar to, or greater than, the thickness of furring strips 28.

As shown in FIG. 1A, a plurality of furring strips 28 may be fit into corresponding grooves 26. The transverse locations at which furring strips 28 may be inserted into corresponding grooves 26 may correspond to the transverse locations of studs 14 (although this is not necessary). Grooves 26 that are located between transversely adjacent studs 14 may not receive furring strips 28 and may therefore be unoccupied. As discussed further below, these unoccupied grooves 26 may function as part of localized ventilation channels 37 which provide vertical passageways for venting moisture from within building wall structure 10. One or more exterior wall layer(s) 30 may be placed against exterior surfaces 33 of furring strips 28. In the illustrated FIG. 1A embodiment, building wall structure 10 includes a single exterior wall layer 30, although this is not necessary and building wall structure 10 may have a plurality of exterior wall layer(s) 30. Exterior wall layer(s) 30 may be made from wood, fibre cement, wood composite, aluminum, stucco, vinyl, mortar, masonry or other suitable material.

In the FIG. 1A embodiment, suitable fasteners 32 (e.g., nails, screws, bolts, etc.) extend through exterior wall layer(s) 30 (or a portion thereof), furring strips 28, insulation panel 20, building wrap 18, sheathing panel 16 and into studs 14, thereby securing exterior wall layer(s) 30 to internal wall layers 19 (e.g. to sheathing 16 and/or studs 14). This is not necessary. In some embodiments of wall structure 10 and ventilation system 12, it is not necessary that fasteners 32 project through furring strips 28. In some embodiments of wall structure 10 and ventilation system 12, fasteners 32 may extend through exterior wall layer(s) 30, optionally through furring strips 28, through insulation panel 20 and into (but not necessarily through) sheathing 16. In some embodiments of wall structure 10 and ventilation system 12, fasteners 32 may extend through exterior wall layer(s) 30, optionally through furring strips 28 and into (but not necessarily through) insulation panel 20. In some embodiments of wall structure 10 and ventilation system 12, a first set of fasteners extends through furring strips 28, insulation panel 20 and into interior building layer(s) 19 (e.g. sheathing 16 and/or studs 14) to mount furring strips 28 to interior wall layer(s) 19. A second set of fasteners may be then be used to mount exterior wall layer(s) 30 to furring strips 28.

Figure 1B:
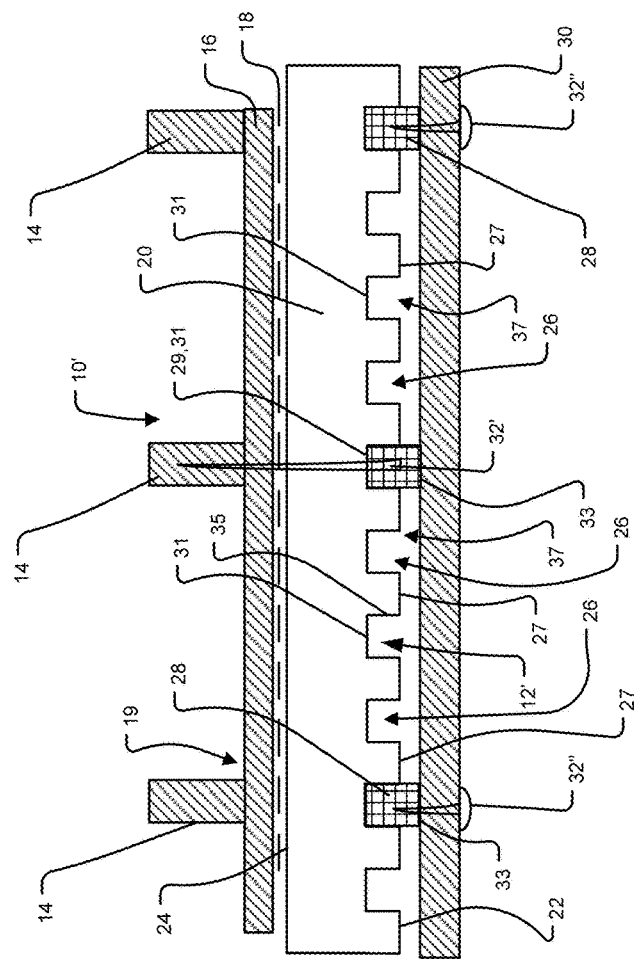
FIG. 1B is a horizontal sectional view of a portion of a building wall incorporating an insulation and ventilation system according to another embodiment of the invention.

Such an embodiment is shown for example in FIG. 1B which shows a schematic sectional view (along a horizontal plane) of a portion of a building wall structure 10' which incorporates an insulation and ventilation system 12' according to a particular embodiment of the invention. Building wall structure 10' and ventilation system 12' of FIG. 1B are similar to building wall structure 10 and ventilation system 12 of FIG. 1A, except that in building wall structure 10' and ventilation system 12', a first set of fasteners 32' (e.g., nails, screws, bolts, etc.) extend through furring strips 28, insulation panel 20, building wrap 18, sheathing panel 16 and into studs 14 to mount furring strips to studs 14 and then a second set of fasteners 32" extend through exterior wall layer(s) 30 (or a portion thereof) and into furring strips 28 to mount exterior wall layer(s) 30 to furring strips 28. Individual fasteners 32', 32" within the first and second sets of fasteners may be located at spaced apart locations (as shown in FIG. 1B) to minimize the ingress of moisture from an exterior of building wall structure 10 to an interior of building wall structure 10. The particular illustrated partial cross-sectional view shown in FIG. 1B shows one of the first set of fasteners 32' in a first furring strip 28 and two of the second set of fasteners 32" in different furring strips 28. It will be appreciated by those skilled in the art, however, that there may be first fasteners 32' and second fasteners 32" at various locations along the same furring strip 28. It is not necessary that the first set of fasteners 32' extend into studs 14. In some embodiments, the first set of fasteners 32' extend inwardly only into (but not necessarily through) sheathing 16 or only into (but not necessarily through) insulation panel 20. In other respects, building wall structure 10' and ventilation system 12' of FIG. 1B are similar to building wall structure 10 and ventilation system 12 of FIG. 1A.

Once insulation panels 20 and exterior wall layer(s) 30 are mounted, localized ventilation channels 37 are provided between transversely adjacent furring strips 28 and between an exterior 22 of insulation panels 20 and an interior of exterior wall layer(s) 30. Ventilation channels 37 permit air flow and moisture drainage therethrough for localized venting of the interior of building wall structure 10. More particularly, suitable apertures (not shown) may be provided through exterior wall layer(s) 30 at suitable locations (e.g. under eaves near the top of wall structure 10 and/or at or near the bottom of wall structure 10). Such apertures provide fluid communication with localized ventilation channels 37 and permit air flow and vapor diffusion therethrough. This airflow and vapor diffusion helps to ventilate channels 37 and to remove moisture from an interior of wall structure 10.

Figure 2A:
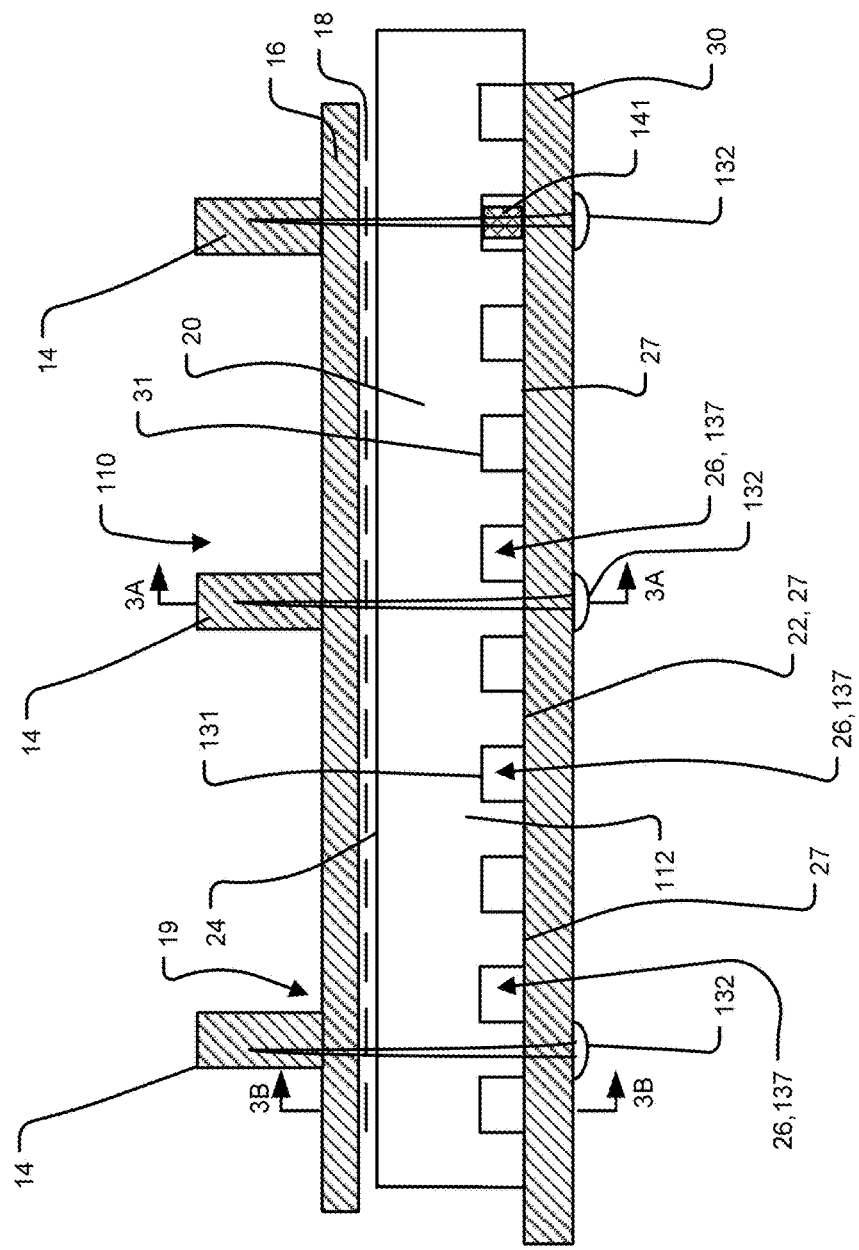
FIG. 2A is a horizontal sectional view of a portion of a building wall incorporating an insulation and ventilation system according to another embodiment of the invention.

FIG. 2A shows a horizontal sectional view of a portion of a building wall 110 incorporating an insulation and ventilation system 112 according to another embodiment. The portion of building wall 110 illustrated in FIG. 2A shows only a single insulation panel 20, it being appreciated that other insulation panels 20 may be mounted in abutting relationship (for example, in the manner shown in FIG. 6B). Many aspects of building wall 110 and insulation and ventilation system 112 are similar to building wall 10 and insulation and ventilation system 12 and are designated using similar reference numerals. More particularly, interior wall layers 19 (including studs 14, optional sheathing 16 and optional building wrap 18) of building wall 110 are substantially similar to those of building wall 10; exterior wall layer(s) 30 of building wall 110 is substantially similar to exterior wall layer(s) 30 of building wall 10; and insulation panel 20 of insulation and ventilation system 112 is substantially similar to insulation panel 20 of insulation and ventilation system 12. Building wall 110 and insulation and ventilation system 112 differ from building wall 10 and insulation and ventilation system 12 in that exterior wall layer(s) 30 of building wall 110 abut directly against the exterior surfaces of protrusions 27—i.e. insulation and ventilation system 112 either does not use furring strips in grooves 26 of insulation panels 20 or optionally uses furring-strip-like inserts 141, where the depth of inserts 141 is substantially similar to the depth of grooves 26 so that exterior wall layer(s) 30 can abut against both inserts 141 and the exterior surfaces of protrusions 27 or where the depth of inserts 141 is less than the depth of grooves 26.

In the FIG. 2A embodiment, fasteners 132 of building wall 110 extend through exterior wall layer(s) 30 (or a portion thereof), insulation panel 20, building wrap 18, sheathing panel 16 and into studs 14, thereby securing exterior wall layer(s) 30 to studs 14. It may be desirable that fasteners 132 extend through insulation panel 20 in the transverse locations corresponding to projections 27 (although this is not necessary) Projecting fasteners 132 through protrusions 27 may have a number of advantages including providing a relatively strong hold of exterior wall layer(s) 30 to the remainder of building wall 110, providing resistance to ingress of moisture via a gasket-like effect of projections 27 around fasteners 132 and possibly reducing "blowout" which may occur in some forms of exterior wall layer(s) 30 (e.g. fiber cement or the like) when a fasteners is fired through exterior wall layer(s) 30 (e.g. by a nail gun or the like).

Projecting fasteners 132 through panel 20 at transverse locations corresponding to protrusions 27 is not necessary. Fasteners 132 may project through insulation panel 20 in transverse locations corresponding to grooves 26). For example, in some embodiments, where it is desirable to project fasteners 132 into studs 14, it is possible that projections 27 do not line up with studs 14 (i.e. a groove 26 (rather than a projection 27) of insulation panel 20 may be transversely aligned with a stud 14). In these situations, an optional furring-strip-like insert member 141 may be first inserted into groove 26. Optional insert members 141 of the FIG. 2A embodiment differ from furring strips 28 discussed above in that insert members 141 have a depth similar to that of grooves 26. In other embodiments, insert members 141 have a depth that is less than that of grooves 26. In the FIG. 2A embodiment, insert members 141 have a transverse width that is less than the width of grooves 26, but this is not necessary. In some embodiments, like furring strips 28, insert members 141 may have transverse dimensions designed for restorative deformation fit within grooves 26. Unlike conventional furring strips 28, insert members 141 may have relatively small vertical dimensions which may be localized to the vertical locations of fasteners 32 (e.g. less than a length of a typical furring strip 28; less than the vertical dimension of insulation panel 20; and/or less than 25% of the vertical dimension of insulation panel 20). In some embodiments, insert members 141 may be fabricated from scraps of the same insulation material used to fabricate panels 20. In other embodiments, insert members 141 may be made of other suitable materials, such as wood, other structural materials and/or the like. It will be appreciated that insert members 141 are not necessary and are completely optional.

As shown in FIG. 2A, exterior building wall layer(s) 30 may be mounted by projecting fasteners 132 through insert member 141, insulation panel 20, and into stud 14 (see FIG. 2A). In some embodiments of building wall 110 and ventilation system 118, exterior building wall layer(s) 30 may be mounted by projecting fasteners 132 through empty grooves 26 of insulation panel 20 and into studs 14. It is not necessary that fasteners project inwardly as far as studs 14. In some embodiments of building wall 110 and ventilation system 118, exterior wall layer(s) 30 are mounted by projecting fasteners through exterior building wall layer(s) 30, optionally through inserts 141, through insulation panel 20 and into (but not necessarily through) sheathing 16. In some embodiments of building wall 110 and ventilation system 118, exterior wall layer(s) 30 are mounted by projecting fasteners through exterior building wall layer(s) 30, optionally through inserts 141, and into (but not necessarily through) insulation panel 20.

Once insulation panels 20 and exterior wall layer(s) 30 are mounted to building wall 110 as shown in FIG. 2A, grooves 26 of insulation panels 20 provide localized ventilation channels 137 between bases 31 of grooves 26 and the interior surface of exterior building wall layer(s) 30. Ventilation channels 137 permit air flow and moisture drainage therethrough for localized venting of the interior of building wall structure 110. More particularly, suitable apertures (not shown) may be provided through exterior wall layer(s) 30 at suitable locations (e.g. under eaves near the top of wall structure 110 and/or at or near the bottom of wall structure 110). Such apertures provide fluid communication with localized ventilation channels 137 and permit air flow and vapor diffusion therethrough. This airflow and vapor diffusion helps to ventilate channels 137 and to remove moisture from an interior of wall structure 110.

In the illustrated FIG. 2A embodiment, the transverse dimensions of projections 27 are approximately the same as the transverse dimensions of grooves 26, although, again, this is not necessary. In some embodiments of building wall 110 and ventilation system 112, the ratios of the transverse widths of projections 27 and grooves 26 may be dictated by applicable building codes, industry standards, industry-accepted criteria and/or the like. For example, in some embodiments of building wall 110 and ventilation system 112, a ratio of the transverse dimension of each groove 26 to each projection 27 on a panel 20 is greater than 3:1. In some embodiments of building wall 110 and ventilation system 112, this ratio is greater than 4:1. In some embodiments of building wall 110 and ventilation system 112, a ratio of the sum of the transverse dimensions of all of the grooves 26 to a sum of the transverse dimensions of all of the projections 27 on a panel 20 is greater than 3:1. In some embodiments of building wall 110 and ventilation system 112, this ratio is greater than 4:1.

In some embodiments the depths of the grooves may additionally or alternatively be specified by applicable building codes, industry standards, industry-accepted criteria and/or the like. For example, in some embodiments of building wall 110 and ventilation system 112, the depth of grooves may be required to be over ¼" (6 mm) thick over at least a portion (e.g. 75% or 80%) of the surface area of the wall. In some embodiments of building wall 110 and ventilation system 112, the depth of grooves may be required to be over ⅜" (10 mm) thick over at least a portion (e.g. 75% or 80%) of the surface area of the wall.

In some embodiments of building wall 110 and ventilation system 112, the transverse widths of grooves 26 are selected to be sufficiently small (e.g. smaller than the narrowest transverse siding width), so that such transversely narrow siding elements of exterior wall layer(s) 30 can be mounted without the need for cross-strapping—e.g. so a siding element of exterior wall layer(s) 30 can span the transverse dimension of grooves 26. In some embodiments of building wall 110 and ventilation system 112, the transverse widths of grooves 26 are selected to be less than 8 inches. In some of building wall 110 and ventilation system 112, the transverse widths of grooves 26 are selected to be less than 4 inches. In some of building wall 110 and ventilation system 112, the transverse widths of grooves 26 are selected to be less than 2 inches.

While expressly not limiting the application of ventilation system 112 of FIG. 2A, ventilation system 112 may be particularly applicable to circumstances where exterior building wall layer(s) 30 are of relatively light weight or moderate weight (e.g. less than 10 lbs. per square foot), where insulation panels are relatively less deep in the inward-outward direction (e.g. less than 3 inches deep) or where furring strips are not required by applicable building codes, industry standards, industry-accepted criteria and/or the like. Conversely, while expressly not limiting the application of ventilation system 12 of FIG. 1A, ventilation system 12 may be particularly applicable to circumstances where exterior building wall layer(s) 30 are of relatively heavy weight (e.g. greater than 10 lbs. per square foot), where insulation panels are relatively deep in the inward-outward direction (e.g. greater than 3 inches deep) or where furring strips are required by applicable building codes, industry standards, industry-accepted criteria and/or the like.

The transversely alternating, vertically extending and outwardly opening grooves 26 and protrusions 27 on insulation panels 20 may provide a number of advantageous features to the operation of insulation and ventilation systems 12, 112 and to building walls 10, 110. Grooves 26 and protrusions 27 provide compartmentalized spaces within ventilation channels 37, 137 which minimize transverse movement of moisture which may be present in a particular groove 26 while allowing moisture that is entrapped therein to vent and escape. Grooves 26 and protrusions 27 may also speed up the installation of furring strips 28 because sidewalls 35 of grooves 26 may hold furring strips 28 in place until furring strips 28 are eventually fastened (e.g. nailed) into interior building wall layer(s) 19 before or after the application of exterior wall layer(s) 30—that is, grooves 26 may make it unnecessary to independently fasten furring strips 28 to interior wall layer(s) 19 or may make require relatively few nails to hold furring strips 28 to interior wall layer(s) 19. Further, because it may not be necessary to separately nail furring strips 28 to interior wall layers 19 or it may require fewer nails to separately nail furring strips 28 to interior wall layers 19, there may be fewer nail holes through insulation panel 20 and through building wrap 18, thereby minimizing heat loss and moisture ingress.

In some embodiments, it may be necessary or desirable to separately fasten furring strips 28 into insulation panel 20 and/or interior wall layers 19 (e.g. into sheathing 16 and/or studs 14). Even in such circumstances, sidewalls 35 of groove 26 may hold furring strips in place temporarily until they are fastened to insulation panel 20 and/or interior wall layer(s) 19 and a relatively small number of fasteners may be used to mount the furring strips (when compared to prior art techniques where furring strips are mounted directly to interior wall layers). Also, furring strips 28 that are mounted in grooves 26 may provide abutment surfaces and/or nailing bases for exterior wall layer(s) 30. Transversely spaced grooves 26 also permit furring strips 28 to be mounted at many different transverse locations along insulation panel 20 including locations that line up with studs 14, although (as discussed above) may not be necessary to line up furring strips 28 with studs 14.

As described above, projections 27 (and grooves 26) may be continuously vertically extending (i.e. without any gaps) between the upper and lower edges 25A, 25B of panel 20. Continuously vertically extending projections 27 provide a number of advantages over projections which have gaps at various location(s) between the upper and lower edges of insulation panels. Continuously vertically extending projections 27 provide corresponding continuously vertically extending grooves 26. In cases where vertically adjacent insulation panels 20 are aligned with one another as shown in FIG. 6B, such continuously vertically extending grooves can extend across vertically adjacent insulation panels 20 (although this is not necessary). As discussed above, continuous vertically extending grooves 26 and protrusions 27 provide compartmentalized spaces within ventilation channels 37, 137 and which may extend across vertically adjacent insulation panels 20 and which minimize transverse movement of moisture that may be present in a particular groove 26 while allowing moisture that is entrapped therein to vent and escape in vertical directions.

In the case of ventilation and insulation system 12 (FIG. 1A), localized ventilation channels 37 are provided between transversely adjacent furring strips 28 and between an exterior 22 of insulation panels 20 and an interior of exterior wall layer(s) 30. Ventilation channels 37 permit air flow and vapor diffusion in vertical directions therethrough but minimize transverse air flow outside of ventilation channels 37. This air flow and vapor diffusion provides transversely localized venting of the interior of building wall structure 10. Similarly, in the case of ventilation and insulation system 112 (FIG. 2A), localized ventilation channels 137 are provided in grooves 26 between bases 31 of grooves 26 and the interior surface of exterior building wall layer(s) 30. Ventilation channels 137 similarly permit air flow in vertical directions therethrough but minimize transverse air flow outside of ventilation channels 137, providing transversely localized venting of the interior of building wall structure 110.

Some building envelope engineers are of the view that transversely localized venting of the interior of building walls has advantages over transversely distributed venting. More particularly, some building envelope engineers submit that transversely localized venting of the interior of building walls permits pressure equalization, whereby pressure within building walls is equalized within transversely localized venting channels and moisture is not transported (e.g. by way of pressure differential) to other parts of the building wall (e.g. beyond the transverse confines of the transversely localized venting channel) where moisture migration to and/or into walls can occur and cause building damage. It will be appreciated that many factors can contribute to pressure differentials as between various locations (e.g. transverse locations) in a building wall including, by way of non-limiting example, time-varying and/or prevailing exposure to sunlight and/or wind or the like. Transversely localized venting channels may provide pressure equalization which may mitigate the deleterious effects of such pressure differentials.

Figure 5A:
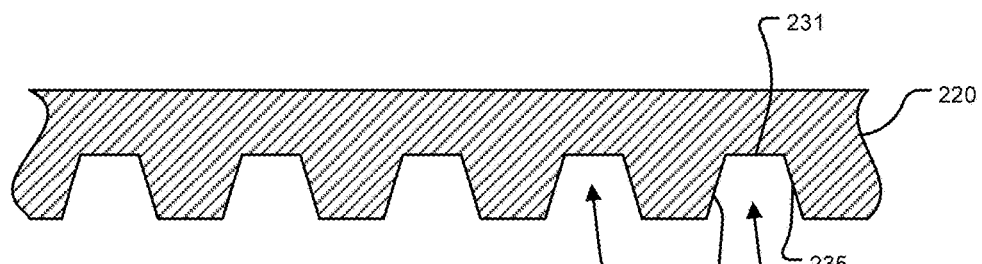
FIGS. 5A-5D are horizontal sectional views of insulation panels according to other embodiments of the invention.

In the illustrated embodiments of insulation and ventilation systems 12, 12', 112 of FIGS. 1A, 1B, 2A, grooves 26 have generally rectangular-shaped cross-sections which include base surfaces 31 (which may extend in transverse and vertical directions) and sidewalls 35 (which may extend in outward and vertical directions). This is not necessary and, in other embodiments, grooves may be provided with other cross-sectional shapes. FIGS. 5A-5D show insulation panels 220, 320, 420 which may be used in the place of insulation panels 20 in systems 12, 12', 112 of FIGS. 1A, 1B, 2A. FIG. 5A depicts an insulation panel 220 according to another embodiment. Grooves 226 of panel 220 are similar to grooves 26 of panel 20 and include sidewalls 235 and base surfaces 231. Grooves 226 differ from grooves 26 in that grooves 226 of panel 220 have beveled sidewalls 235 shaped such that grooves 226 are transversely wider at their exterior edges and transversely narrower at their interiors (e.g. at their base surfaces 231). Grooves 226 may be more easily accommodate the insertion of furring strips (not shown), although it will be appreciated that the user of furring strips with panels 220 is not required.

Figure 5B:
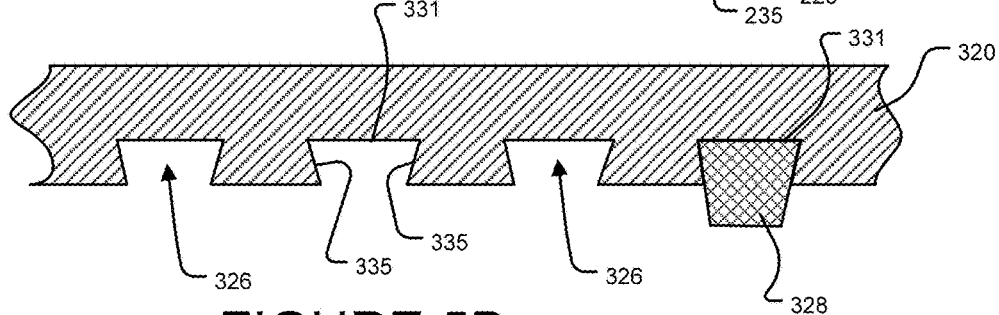

FIG. 5B depicts an insulation panel 320 according to another embodiment. Grooves 326 of panel 320 are similar to grooves 26 of panel 20 and include sidewalls 335 and base surfaces 331. Grooves 326 differ from grooves 26 in that grooves 326 of panel 320 have beveled sidewalls 335 shaped such that grooves 326 are transversely narrower at their exterior edges and transversely wider at their interiors (e.g. at their base surfaces 331). Grooves 326 may be deformed for insertion of complementary beveled furring strips 328. The beveled shape of sidewalls 335 of grooves 326 and corresponding beveled shape of furring strips 328 may help retain furring strips 328 in grooves 326. It will be appreciated however, that the use of furring strips 328 with panel 320 is not requires.

Figure 5C:
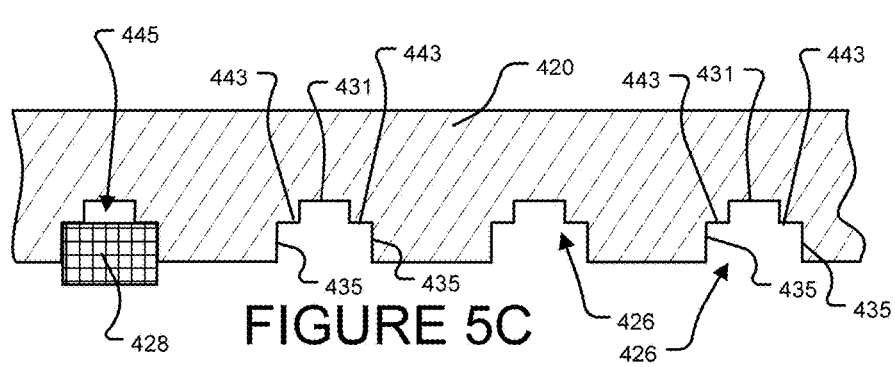

FIG. 5C depicts an insulation panel 420 according to another embodiment. Grooves 426 of panel 420 are similar to grooves 26 of panel 20 and include sidewalls 435 and base surfaces 431. Grooves 426 differ from grooves 26 in that grooves 426 of panel 420 comprise steps 443 which extend outwardly from base 431 and transversely from each of sidewalls 435 to provide grooves 426 with a stepped base profile. This stepped base profile of grooves 426 permits furring strips 428 to extend further outwardly from the external surface of panel 420 (relative to the flat base profile of grooves 26 of panel 20, for example) which in turn provides a greater volume ventilation channel. Alternatively, this stepped base profile of grooves 426 permits furring strips 428 to be made thinner (in depth) and correspondingly less expensively while providing the same volume of ventilation channel. In the illustrated embodiment of FIG. 5C, steps 443 are integrally formed with panel 420. In other embodiments, steps 443 may be provided as part of an insert which may be inserted into non-stepped grooves (e.g. grooves 26 of panel 20) to provide a greater volume ventilation channel and/or to permit the use of thinner furring strips 428. In the illustrated embodiment, steps 443 also provide secondary interior ventilation channels 445 within grooves 426 and interior to furring strips 428, although this is not necessary. In some embodiments, non-stepped inserts may be provided which may be inserted into non-stepped grooves (e.g. grooves 26 of panel 20) to provide a greater volume ventilation channel and/or to permit the use of thinner furring strips 428 without interior ventilation channels 445. It will be appreciated however, that the use of furring strips 428 with panel 420 is not required.

Figure 5D:
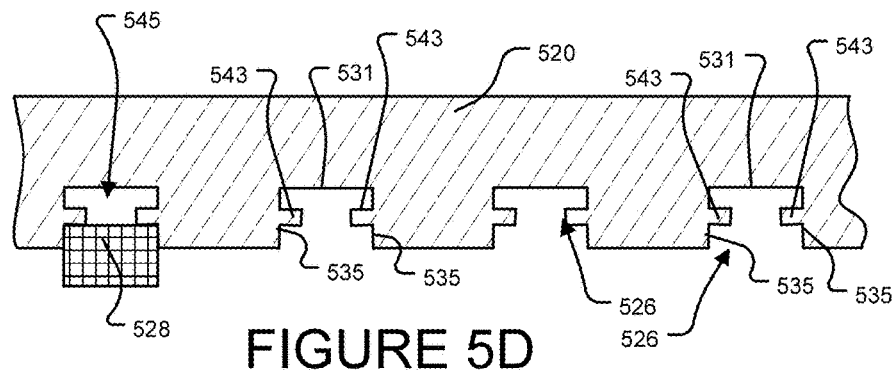

FIG. 5D depicts an insulation panel 520 according to another embodiment. Grooves 526 of panel 520 are similar to grooves 26 of panel 20 and include sidewalls 535 and base surfaces 531. Grooves 526 differ from grooves 26 in that sidewalls 535 of grooves 526 of panel 520 comprise flanges 543 which extend transversely from each of sidewalls 535 to provide sidewalls 535 of grooves 526 with a flanged sidewall profile. This flanged sidewall profile of grooves 526 permits furring strips 528 to abut against the external surfaces of flanges 543 rather than base 531 to thereby extend further outwardly from the external surface of panel 520 (relative to the flat sidewall profile of grooves 26 of panel 20, for example) which in turn provides a greater volume ventilation channel. Alternatively, this flanged sidewall profile of grooves 526 permits furring strips 528 to be made thinner (in depth) and correspondingly less expensively while providing the same volume of ventilation channel. In the illustrated embodiment of FIG. 5D, flanges 543 are integrally formed with panel 520. In other embodiments, flanges 543 may be provided as part of an insert which may be inserted into non-flanged grooves (e.g. grooves 26 of panel 20) to provide a greater volume ventilation channel and/or to permit the use of thinner furring strips 528. In the illustrated embodiment, flanges 543 also provide secondary interior ventilation channels 545 within grooves 526 and interior to furring strips 528, although this is not necessary. In some embodiments, flanges 543 may be provided as "break-away" features which may be removed (e.g. by chisel, suitable cutting blade or otherwise) from sidewalls 535 to thereby permit the effective depth of grooves 526 of panel 520 to be adjustable as desired for particular applications. It will be appreciated however, that the use of furring strips 528 with panel 520 is not requires.

In addition to transversely localized venting, in the case of ventilation and insulation system 112 (FIG. 2A), continuously extending projections 27 also provide continuous abutment surfaces for abutting exterior wall layer(s) 30 to insulation panel 20. For example, as discussed above in connection with FIG. 2A, exterior wall layer(s) 30 may abut against projections 27 and, when so abutted, fasteners 132 may project through exterior wall layer(s), through insulation panel 20 and into interior wall layers 19 (e.g. through sheathing 16 and into studs 14 or into (but not necessarily through) sheathing 16) to mount exterior wall layer(s) 30. In some embodiments, when exterior wall layer(s) 30 abut against continuously extending projections 27, fasteners 132 may project through exterior wall layer(s) 30 and into (but not necessarily through) insulation panel 20.

Figure 3A:
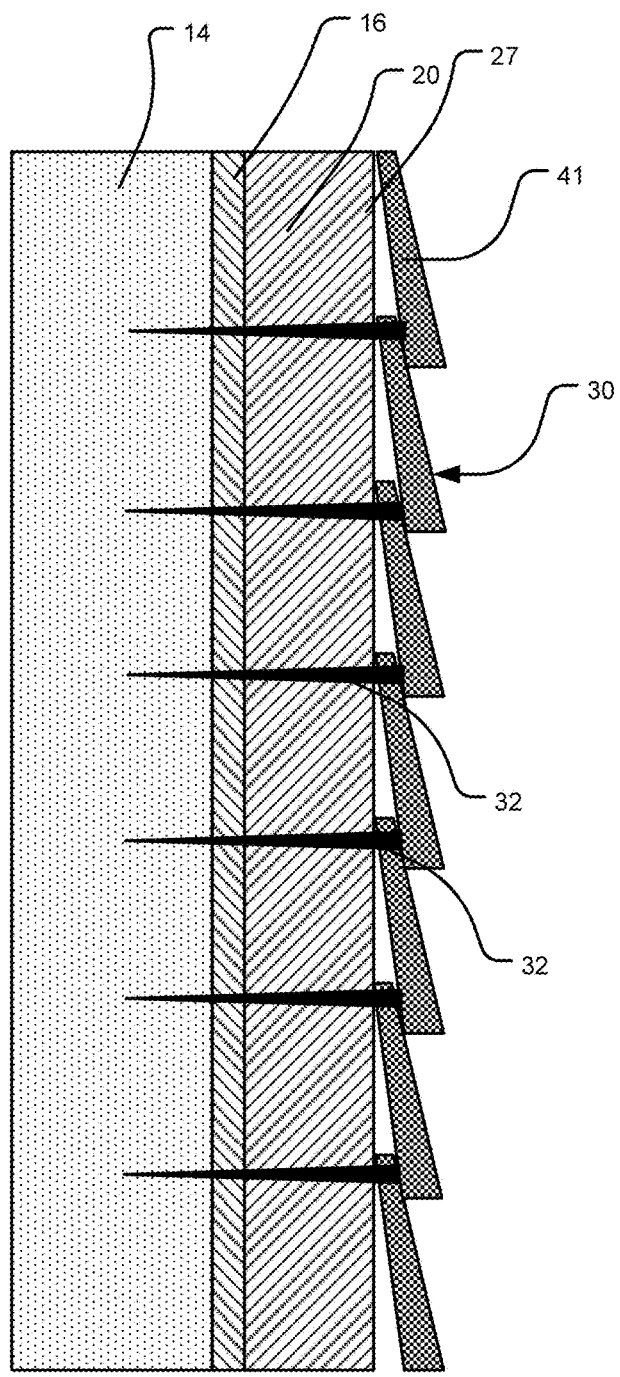
FIG. 3A is a vertical sectional view of the FIG. 2A insulation and ventilation system taken along line 3A-3A.
Figure 3B:
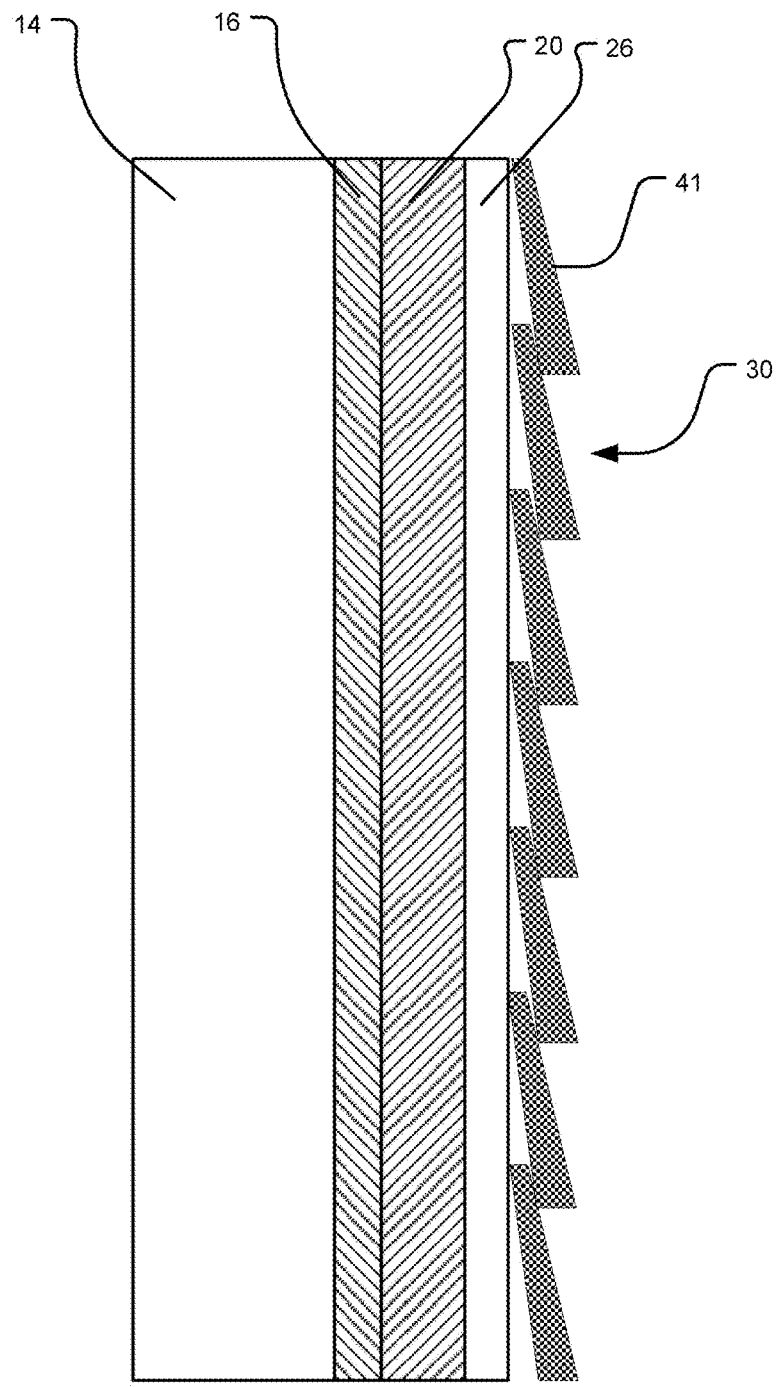
FIG. 3B is a vertical sectional view of the FIG. 2A insulation and ventilation system taken along line 3B-3B.

As described above in connection with FIG. 2, this technique for abutting and mounting exterior wall layer(s) 30 directly to insulation panel 20 can eliminate the requirement for furring strips. This is best seen in FIGS. 3A, 3B which show vertical sectional views of building wall structure 110 (FIG. 2A) taken along line 3A-3A and line 3B-3B (FIG. 2A) respectively. FIG. 3A shows a vertical sectional view through a projection 27 of insulation panel 20 and FIG. 3B shows a vertical sectional view through a groove 26 of insulation panel 20. In FIGS. 3A, 3B, as is typical in many building wall structures, exterior wall layer(s) 30 includes horizontally (transversely) extending siding members 41 arranged in partially vertically overlapping horizontal rows. Siding members 41 of the FIG. 3A, 3B embodiment comprise cedar siding, but may be made of other materials, including vinyl, fibre cement, wood composite, aluminum and/or the like, as is known in the art. Continuously extending projections 27 provide continuous abutment surfaces for abutting siding members 41 to building wall structure 10. Fasteners 132 may (but need not necessarily) project through projections 27. Furring strips 28 are not required. This simplifies the process of installing exterior wall layer(s) 30 and reduces costs.

If projections 27 were not vertically continuous (i.e. included transversely extending gaps at particular vertical locations), such gaps would prevent the partially vertically overlapping arrangement of siding members 41 on projections 27 because there would be no abutment surfaces (no projections 27) at the vertical locations of such gaps. Accordingly, the horizontally extending siding members 41 may fall into such gaps, making it difficult or impossible to properly abut exterior wall layer(s) 30 against insulation panel 20 in the region of such gaps.

Figure 4A:
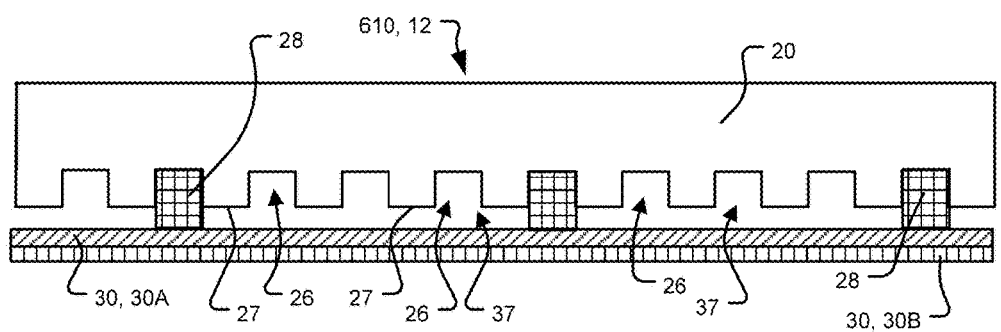
FIG. 4A is a partial horizontal sectional view of the FIG. 1A insulation and ventilation system in use in a different building wall.

Exterior wall layer(s) 30 are not limited to siding of the type shown in FIGS. 3A and 3B. Exterior wall layer(s) 30 may comprise one or more exterior wall layer(s) 30 of any suitable type, including, by way of non-limiting example, ship-lap siding, shingles, stucco, mortar, and man-made stone or masonry finishes. FIG. 4A is a partial horizontal cross-section showing insulation panel 20 of insulation and ventilation system 12 (FIG. 1A) in use in a wall structure 610 having a plurality of exterior wall layer(s) 30. More particularly, in the FIG. 4A embodiment, exterior wall layer 30A is mounted to furring strips 28 and provides a backerboard, lathe, building paper, building fabric (e.g. polypropylene fibers) and/or the like for stucco or mortar exterior wall layer 30B. Exterior wall layer 30A may also prevent stucco or mortar from filling in grooves 26 of insulation panel 20. It will be appreciated that other exterior wall layer(s) (e.g. similar to the multiple external wall layers 30A, 30B of exterior wall structure 30 shown in FIG. 4A) could be used with the insulation and ventilation system 112 of FIG. 2A—i.e. without furring strips.

Figure 4B:
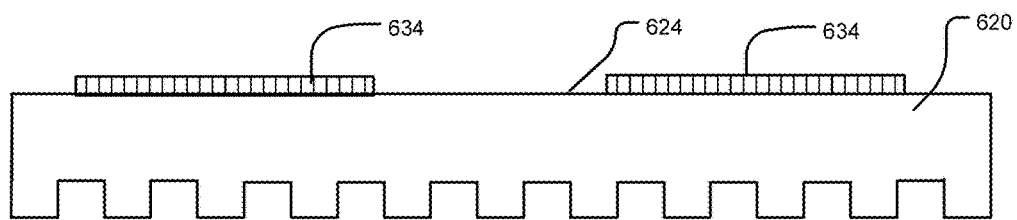
FIG. 4B is a horizontal sectional view of an insulation panel according to another embodiment of the invention.

FIG. 4B shows a horizontal cross-sectional view of an insulation panel 620 according to another embodiment. In the FIG. 4B embodiment, interior side 624 of insulation panel 620 includes a "peel and stick" type tape or some other suitable adhesive 634 which may be integrally provided with panel 620. Adhesive 634 allows insulation panel 620 to be adhesively secured to interior wall layers 19 (not shown in FIG. 4B). Adhesive 634 permits panel 620 to be mounted without (or with a relatively small number of) nails or other fasteners which project through insulation panels and into interior wall layers 19. Adhesive 634 may be applied to (or integrally formed with) the interior side 624 of insulation panel 620 in the shape of spaced apart vertical columns. Adhesive 634 on interior side 624 of insulation panel 620 provides a number of other advantages in addition to mounting panel 620 to interior building wall layers 19 without using fasteners. Adhesive 634 speeds up the installation of insulation panel 620. Further, application (or integral formation) of adhesive 634 in the shape of spaced apart columns on the interior surface 624 of insulation panel 620 may create small gaps between interior surface 624 of insulation panel 620 and interior building wall layers 19 which may allow moisture entrapped therebetween to vent and dissipate.

Figure 7:
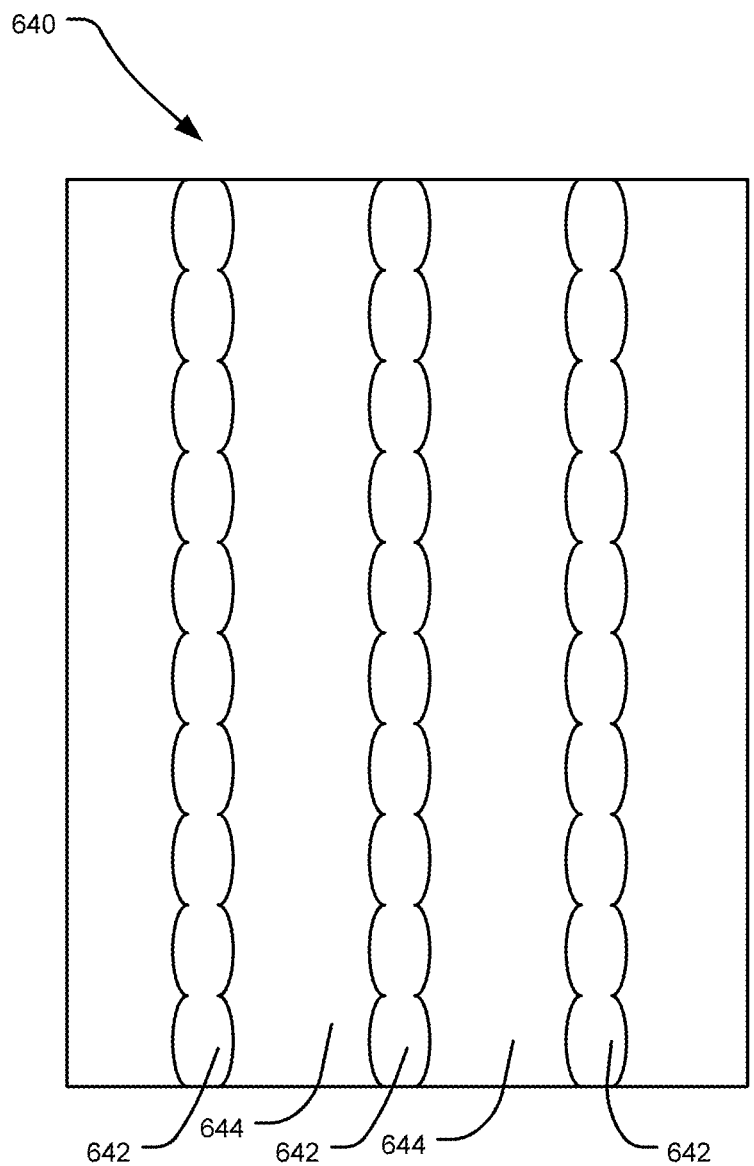
FIG. 7 is a schematic plan view of a insulation panel according to another embodiment of the invention.
Figure 8:
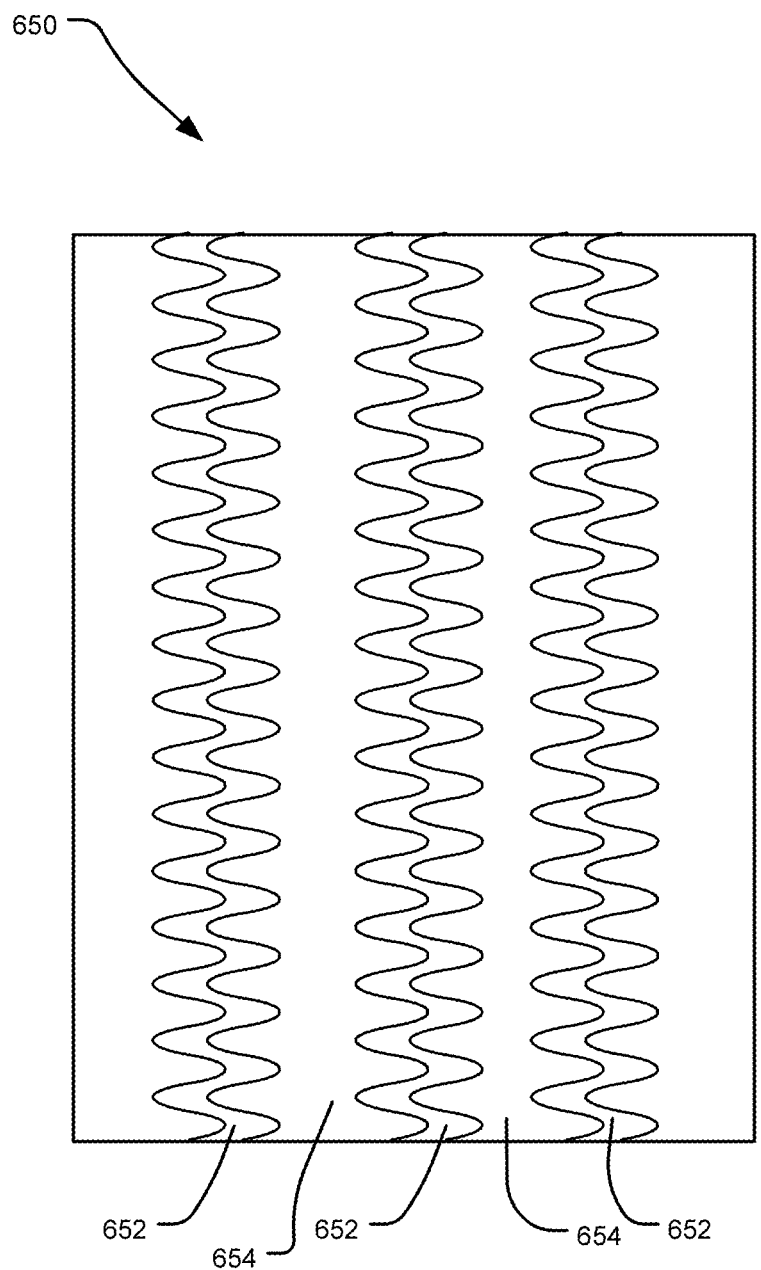
FIG. 8 is a schematic plan view of a insulation panel according to another embodiment of the invention.
Figure 9:
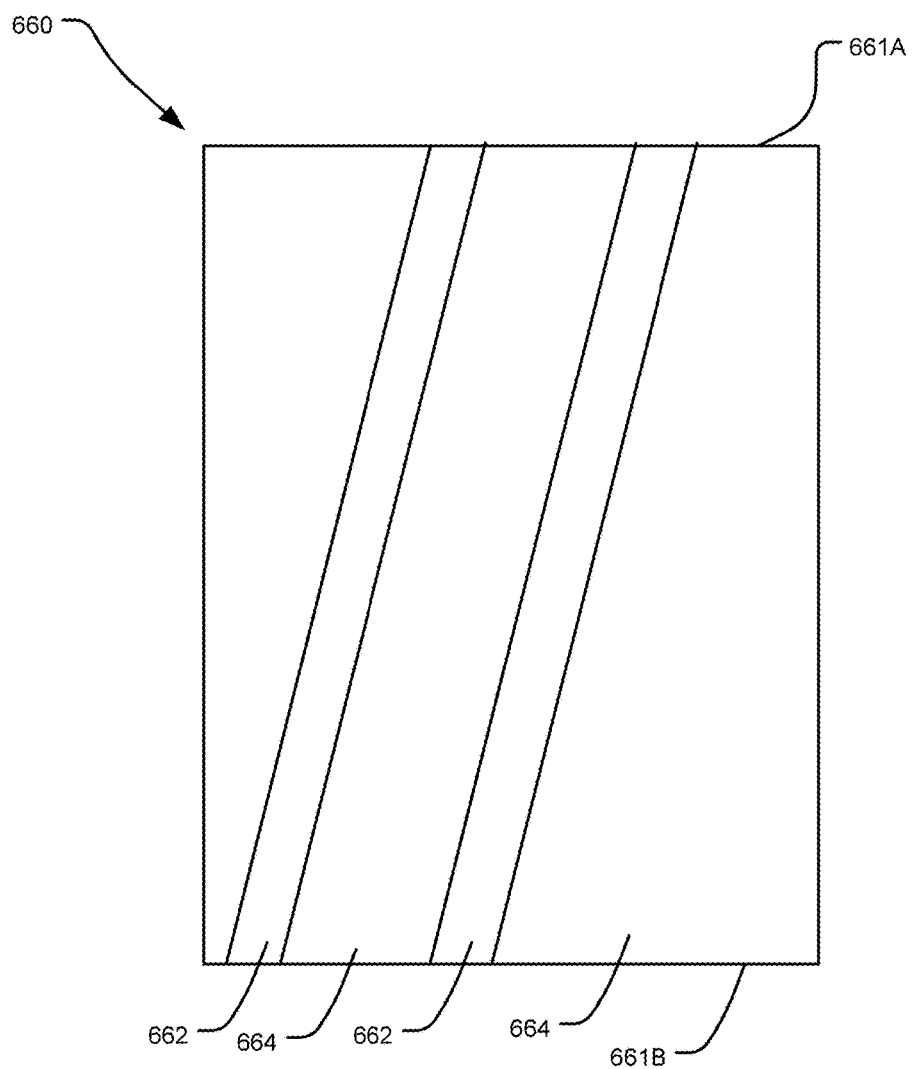
FIG. 9 is a schematic plan view of a insulation panel according to another embodiment of the invention.

FIG. 7 shows a plan view of an insulation panel 640 according to another embodiment. Panel 640 differs from the panels described above in that panel 640 includes continuous vertically extending and outwardly opening grooves 642 (and corresponding projections 644) having wave-shaped contours. In the FIG. 7 embodiment, the transverse width of grooves 642 is not uniform along their vertical lengths. FIG. 8 shows a plan view of an insulation panel 650 according to another embodiment. Panel 650 differs from the panels described above in that panel 650 includes continuous vertically extending and outwardly opening grooves 652 (and corresponding projections 654) having curved S-shaped sidewalls. FIG. 9 shows a plan view of an insulation panel 660 according to another embodiment. Panel 660 differs from the panels described above in that panel 660 includes continuous vertically extending and outwardly opening grooves 662 (and corresponding projections 664) which are oriented at an oblique angle relative to top edge 661A and bottom edge 661B of insulation panel 660. In other embodiments, panels similar to panel 660 of FIG. 9 may be provided with continuously vertically extending and outwardly opening grooves which have "zig-zag" shapes that alternatingly extend in one oblique angle relative to edges 661A, 661B and then in another oblique angle relative to edges 661A, 661B. One advantage of the insulation panels 604, 650, 660 in FIGS. 7-9 is that there is a greater chance that their grooves or their projections overlaps a stud 14 (not shown in FIGS. 7-9) which can be used as a nail receiver.

Figure 10:
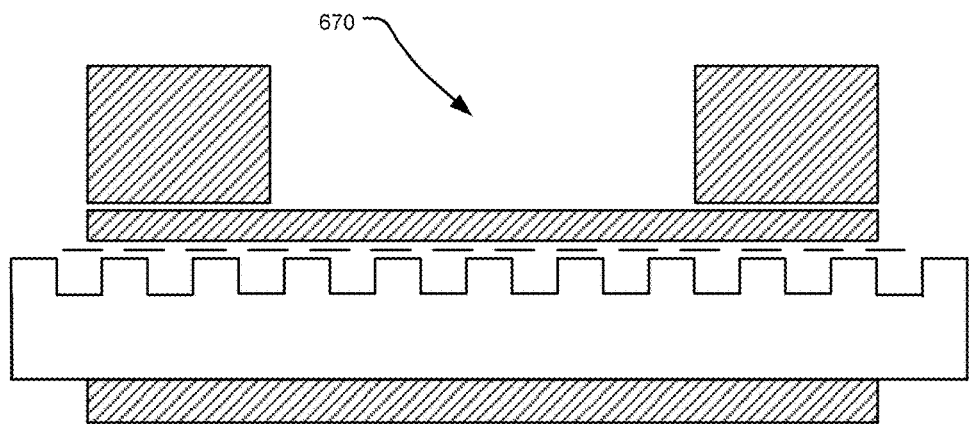
FIG. 10 is a horizontal sectional view of an insulation and ventilation system according to another embodiment of the invention.

As will be apparent to those skilled in the art in the light of the foregoing disclosure, many alterations and modifications are possible in the practice of this invention without departing from the spirit or scope thereof. For example:

- The depth of the ventilation channel in a building wall may be specified by building codes industry standards, industry-accepted criteria, architects, engineers or other professionals or professional organizations. This ventilation channel depth may be a function of prevailing weather conditions in a region. For example, it may be desirable to have relatively high volume ventilation channels in relatively wet regions. In some embodiments, it is desirable to have a ventilation channel depth of 1 mm or greater over a threshold surface area of a building wall. In some embodiments, it is desirable to have a ventilation channel depth of 6 mm or greater over a threshold surface area of a building wall. In other embodiments, it is desirable to have a ventilation channel depth of 10 mm or greater over a threshold surface area of a building wall. In still other embodiments, it is desirable to have a ventilation channel depth of 20 mm or greater over a threshold surface area of a building wall. In some embodiments, the threshold surface area of the wall is greater than 60%. In some embodiments, this threshold surface area is greater than 75%. In some embodiments, this threshold surface area is greater than 80%. This ventilation panel depth may be obtained by selecting the corresponding depth of the grooves in the insulation panels and/or the corresponding depth of furring strips. In some embodiments, spacers may be inserted into the insulation panel grooves before the insertion of furring strips (i.e. such spacers may be located in the grooves on an interior of the furring strips). Such spacers may cause the furring strips to project outwardly further from the exterior surface of the insulation panel (e.g. of the projections) and may thereby provide a larger ventilation channel.
- In some embodiments, the location of protrusions 27 may be dictated by the locations of studs 14 of interior building wall layer(s) 19. For example, in some embodiments, protrusions 27 may be provided at 8", 16" or 24" center-spacing to correspond to the spacing of studs 14 of interior of interior building wall layer(s) 19. In some such embodiments, protrusions 27 may be selected to have transverse widths in a range of 1-3".
- In some embodiments, continuous, transversely alternating, vertically extending grooves and projections may be disposed on the interior (rather than or in addition to the exterior side) of insulation panels. FIG. 10 depicts an embodiment of an insulation and ventilation system 670 comprising an insulation panel having grooves and protrusions disposed on its interior surface. The features of the continuous, transversely alternating, vertically extending grooves of insulation and ventilation system 670 may be similar to those of insulation and ventilation systems 12, 112 described herein. By way of non-limiting example, the ratios of the transverse widths of the grooves to the protrusions of system 670 may be similar to those of systems 12, 112. In the illustrated FIG. 10 embodiment, the exterior side of the insulation panels may be generally flat and exterior building wall layers may be applied to the exterior surface of the insulation panels. This embodiment may be well suited to exterior wall surfaces of stucco or the like which may be troweled or painted onto the exterior side of the insulation panels. Any moisture on an interior of the insulation panels could still be drained or vented on the grooved interior side of the insulation panels. The FIG. 10 embodiment could be provided with continuous, transversely alternating, vertically extending grooves and projections disposed on both the interior and exterior sides of the insulation panel to implement an insulation and ventilation system similar to insulation and ventilation system 12 (FIGS. 1A and 1B—with furring strips 28) or an insulation and ventilation system similar to insulation and ventilation system 112 (FIG. 2A—without furring strips 28).
- In some embodiments, the sidewalls of grooves may be shaped to provide one or more venting/drainage gaps between the sidewalls and the transverse sides of furring strips. One example of this is shown in FIG. 5A with the beveled sidewalls 235 of groove 226 which can provide venting gaps between sidewalls 235 and a rectangular shaped furring strip which may be inserted therein. Similarly, beveled sidewalls 335 of groove 326 shown in FIG. 5B can provide venting/drainage gaps at the sides of a rectangular shaped furring strip which may be inserted therein. Similar venting/drainage may be provided by providing sidewalls of grooves with various convex and/or concave shapes. The bases of grooves may be similarly shaped to provide one or more venting/drainage gaps between the bases and the interior surfaces of furring strips. One example of this is shown by base 431 of groove 426 of FIG. 5C which provides drainage/venting gap 435. Similar venting/drainage may be provided by providing the bases of grooves with various convex and/or concave shapes.
- In some embodiments, the interior surface (e.g. interior surface 24) of the insulation panel may be provided with a non-planar profile which may permit venting and/or drainage between the interior surface and interior building layers. Such non-planar profile may comprise one or more protrusions and/or one or more depressions. Such protrusions and depressions may be formed in a checkerboard pattern. In some embodiments, such interior surface protrusions/depressions may have depths less than 20% of the depth of the grooves on the exterior surface of the insulation panels. In some embodiments, such interior surface protrusions/depressions may have depths less than 10% of the depth of the grooves on the exterior surface of the insulation panels.
- In some embodiments, the edges of insulation panels (e.g. insulation panels 20) may be provide with a tongue-and-groove profile or the like, so that horizontally and/or vertically adjacent panels may be fitted together in an abutting tongue-and-groove relationship. As discussed above, in the illustrated embodiment of FIG. 6B, vertically adjacent panels are aligned such that their protrusions and grooves are also aligned. While this arrangement provides the advantages of transversely localized venting referred to herein, this arrangement is not necessary. In some embodiments, vertically adjacent panels may be aligned such that their protrusions and grooves are offset from one another.
- In some embodiments, insulation panels according to various embodiments of the invention (e.g. insulation panel 20) may be fabricated from or may comprise structural insulating material. In such embodiments, as mentioned briefly above, external building layer(s) 30 and/or furring strips 28 may be directly mounted to the insulation panels (e.g. by fasteners which project into (but not necessarily through) the insulation panels.

In some embodiments, insulation panels according to various embodiments of the invention (e.g. insulation panel 20) may be fabricated from or may comprise one or more vapor-impermeable layer(s). In other embodiments, insulation panels according to various embodiments of the invention (e.g. insulation panel 20) may be vapor-permeable.

In some embodiments, insulation panels according to various embodiments of the invention (e.g. insulation panel 20) may be fabricated with virtually any suitable depth in the inward-outward direction. In particular non-limiting embodiments, the inward-outward depth of insulation panels is in a range of 0.5-12 inches. In other non-limiting embodiments, this depth is in a range of 1-3 inches.

As will be appreciated by those skilled in the art, the insulation and ventilation systems described herein have applications in building envelope structures other than wall structures. The invention may be employed in roofing structures. For example, roofing shingles, panels, and other roofing type materials may be installed on various insulation panels described herein to create air-space, drainage and ventilation, environmental separation, insulation and many of the other benefits described above in connection with wall structures.

One aspect of the invention provides a kit for assembling an insulation and ventilation system for a building envelope (e.g. a building wall and/or a building roof) having one or more interior building envelope layer(s) and one or more exterior building envelope layer(s). The kit may have the feature or features of the insulation and ventilation systems described herein.

One aspect of the invention provides an insulation panel for providing insulation and ventilation in a building envelope (e.g. a building wall and/or a building roof) having one or more interior building envelope layer(s) and one or more exterior building envelope layer(s). The insulation panel may have the feature or features of the insulation and ventilation systems described herein.

One aspect of the invention provides a method for providing insulation and ventilation in a building envelope (e.g. a building wall and/or a building roof), the method comprising: providing an insulation panel having an interior side and an exterior side having a plurality of transversely spaced and continuously longitudinally extending grooves interspaced between a plurality of transversely spaced and continuously longitudinally extending protrusions, the continual longitudinal extension of the grooves and protrusions orthogonal to the transverse spacing of the grooves and protrusions; abutting the interior side of the insulation panel against an exterior surface of one or more internal building envelope layer(s); and mounting one or more exterior building envelope layer(s) at locations outward of the insulation panel to thereby provide a plurality of transversely localized venting channels defined at least in part by an interior surface of the one or more exterior building envelope layer(s) and the grooves of the exterior side of the insulation panel. The method may comprise additional steps or features, e.g., features of the insulation and ventilation systems described herein.

Various elements of the invention may be used alone, in combination, or in a variety of arrangements not specifically discussed in the embodiments described in the foregoing. For example, elements described in one embodiment may be combined with elements described in other embodiments.

The scope of the claims should not be limited by the embodiments set forth in the examples, but should be given the broadest interpretation consistent with the description as a whole.

What is claimed is:

1. An insulation system for a building envelope, the system comprising:
    one or more first building envelope layers;
    an insulation panel having a first side abutting against at least one of the one or more first building envelope layers and a second side having a plurality of transversely spaced and continuously longitudinally extending grooves interspaced between a plurality of transversely spaced and continuously longitudinally extending protrusions, the continual longitudinal extension of the grooves and protrusions orthogonal to the transverse spacing of the grooves and protrusions;
    one or more second building envelope layers located adjacent to the insulation panel; and
    a plurality of channels defined at least in part by a surface of the one or more second building envelope layers and the grooves of the second side of the insulation panel;
    wherein the continual longitudinal extension of the grooves and protrusions extends continuously along an entire longitudinal dimension of the panel to thereby provide the plurality of channels with corresponding longitudinal extension along the entire longitudinal dimension of the panel;
    wherein the longitudinal extension of the grooves and protrusions is oriented at least partially vertically for gravity-based drainage of moisture through the channels;
    wherein the insulation panel comprises a rigid foam insulation panel; and
    wherein the rigid foam insulation panel comprises a vapor-impermeable panel.

2. An insulation system according to claim 1 wherein there is no fluid path from the second side to the first side of the insulation panel.

3. An insulation system according to claim 1 wherein the first side of the insulation panel is generally planar.

4. An insulation system according to claim 1 wherein the insulation panel has a thickness, defined as the distance between the first side and the second side, which varies due to the protrusions and the grooves.

5. An insulation system according to claim 1 wherein at least one of the one or more second building envelope layers is mounted to at least one of the one or more first building envelope layers by fasteners which project through the at least one of the one or more second building envelope layers and through the insulation panel and into the at least one of the one or more first building envelope layers.

6. An insulation system according to claim 1 wherein a cross-sectional perimeter of one or more of the channels is completely defined by the surface of the one or more second building envelope layers and the grooves of the second side of the insulation panel.

7. An insulation system according to claim 1 wherein the system comprises a plurality of longitudinally adjacent insulation panels aligned with each other such that the continuously longitudinally extending grooves extend across the longitudinally adjacent insulation panels.

8. An insulation system according to claim 1 wherein the plurality of grooves are evenly transversely spaced from one another.

9. An insulation system according to claim 1 wherein in at least a portion of the insulation panel, a ratio of a transverse width of one of the longitudinally extending grooves to a transverse width of an adjacent one of the longitudinally extending protrusions is greater than or equal to 3:1.

10. An insulation system according to claim 1 wherein the grooves have a generally rectangular-shaped cross-section.

11. An insulation system according to claim 1 wherein the grooves have beveled sidewalls to provide a trapezoidal-shaped cross-section.

12. An insulation system according to claim 1 wherein the first side of the insulation panel comprises an adhesive in the shape of spaced apart vertical columns for mounting the insulation panel to the at least one of the one or more first building envelope layers.

13. A kit for assembling an insulation system for a building envelope having one or more first building envelope layers and one or more second building envelope layers, the kit comprising:
  a rigid foam insulation panel having a first side shaped for abutting against at least one of the one or more first building envelope layers and a second side having a plurality of transversely spaced and continuously longitudinally extending grooves interspaced between a plurality of transversely spaced and continuously longitudinally extending protrusions, the continual longitudinal extension of the grooves and protrusions orthogonal to the transverse spacing of the grooves and protrusions and the panel shaped for fitting on a first side of the one or more second building envelope layers to provide a plurality of channels defined at least in part by a surface of the first side of the one or more second building envelope layers and the grooves of the second side of the insulation panel;
  wherein the continual longitudinal extension of the grooves and protrusions extends continuously along an entire longitudinal dimension of the panel to thereby provide the plurality of channels with corresponding longitudinal extension along the entire longitudinal dimension of the panel;
  wherein the grooves have a substantially rectangular transverse cross-section along their entire longitudinal extension; and
  wherein the rigid foam insulation panel comprises a vapor-impermeable panel.

14. A kit according to claim 13 wherein a ratio of a sum of transverse widths of the longitudinally extending grooves of the insulation panel to a sum of transverse widths of the longitudinally extending protrusions of the insulation panel is greater than or equal to 3:1.

15. A kit according to claim 13 wherein a cross-sectional perimeter of one or more of the channels is completely defined by the surface of the first side of the one or more second building envelope layers and the grooves of the second side of the insulation panel.

16. A method for providing insulation in a building envelope, the method comprising:
  providing a rigid foam insulation panel having a first side and a second side having a plurality of transversely spaced and continuously longitudinally extending grooves interspaced between a plurality of transversely spaced and continuously longitudinally extending protrusions, the continual longitudinal extension of the grooves and protrusions orthogonal to the transverse spacing of the grooves and protrusions, wherein the rigid foam insulation panel comprises a vapor-impermeable panel;
  abutting the first side of the insulation panel against a first surface of one or more first building envelope layers; and
  mounting one or more second building envelope layers at locations adjacent the second side of the insulation panel to thereby provide a plurality of channels defined at least in part by a second surface of the one or more second building envelope layers and the grooves of the second side of the insulation panel;
  wherein the continual longitudinal extension of the grooves and protrusions extends continuously along an entire longitudinal dimension of the panel to thereby provide the plurality of channels with corresponding longitudinal extension along the entire longitudinal dimension of the panel; and
  orienting the longitudinal extension of the grooves and protrusions at least partially vertically for gravity-based drainage of moisture through the channels.

17. A method according to claim 16 wherein a ratio of a sum of transverse widths of the longitudinally extending grooves of the insulation panel to a sum of transverse widths of the longitudinally extending protrusions of the insulation panel is greater than or equal to 3:1.

18. A method according to claim 16 wherein a cross-sectional perimeter of one or more of the channels is completely defined by the second surface of the one or more second building envelope layers and the grooves of the second side of the insulation panel.

19. A kit according to claim 13 comprising a plurality of insulation panels shaped for longitudinally adjacent and longitudinally aligned mounting with each other such that the continuously longitudinally extending grooves extend across the longitudinally adjacent insulation panels.

20. An insulation panel comprising:
  a rigid foam insulation panel comprising a first side and a second side;
  the second side having a plurality of transversely spaced and continuously longitudinally extending grooves interspaced between a plurality of transversely spaced and continuously longitudinally extending protrusions, the continual longitudinal extension of the grooves and protrusions orthogonal to the transverse spacing of the grooves and protrusions;
  wherein the continual longitudinal extension of the grooves and protrusions extends continuously along an entire longitudinal dimension of the panel; and
  wherein the grooves have a substantially rectangular transverse cross-section along their entire longitudinal extension;
  wherein the rigid foam insulation panel comprises a vapor-impermeable panel.

21. An insulation panel according to claim 20 wherein there is no fluid path from the first side to the second side of the insulation panel.

22. An insulation system according to claim 1 wherein a depth of the grooves is greater than ¼ inch over at least 75% of a surface area of the abutting contact between the first side of the panel and the one or more first building layers.

* * * * *